United States Patent [19]
Schonstedt

[11] 3,909,704
[45] Sept. 30, 1975

[54] MAGNETIC LOCATOR HAVING SENSOR UNITS WITH TWO-PIECE HOUSINGS AND TUBULAR CORES

[75] Inventor: Erick O. Schonstedt, Reston, Va.

[73] Assignee: Schonstedt Instrument Company, Reston, Va.

[22] Filed: Apr. 29, 1974

[21] Appl. No.: 465,357

Related U.S. Application Data

[63] Continuation-in-part of Ser. No. 303,598, Nov. 3, 1972.

[52] U.S. Cl. ............... 324/3; 324/41; 324/43; 336/198
[51] Int. Cl.² ............... G01R 33/02; G01V 3/08; H01F 27/30
[58] Field of Search ............... 324/3, 6, 8, 43, 37; 336/198, 208, 92, 192, 196

[56] References Cited
UNITED STATES PATENTS

| 2,514,577 | 7/1950 | Heller | 336/198 X |
| 2,598,371 | 5/1952 | Gusdorf | 336/198 X |
| 2,981,885 | 4/1961 | Schonstedt | 324/43 R |
| 3,076,930 | 2/1963 | Schonstedt | 324/43 R |
| 3,112,898 | 12/1963 | Stahl | 336/198 X |
| 3,218,592 | 11/1965 | Barrick | 336/198 |
| 3,684,993 | 8/1972 | Hazen et al. | 336/208 |

Primary Examiner—Gerard R. Strecker
Attorney, Agent, or Firm—Shapiro and Shapiro

[57] ABSTRACT

Magnetic locator employs improved flux-gate sensor units having a single elongated tubular magnetic core contained in an easily assembled, two-piece cylindrical housing. A signal winding wound about the housing in a circumferential groove holds the housing sections together around the core and provides close magnetic coupling to the core. When the sensor unit is mounted in a longitudinal groove at the end of a tubular support, the housing sections are clamped together by the support for preventing movement of the core in the housing.

8 Claims, 7 Drawing Figures

U.S. Patent   Sept. 30, 1975   Sheet 1 of 2   3,909,704
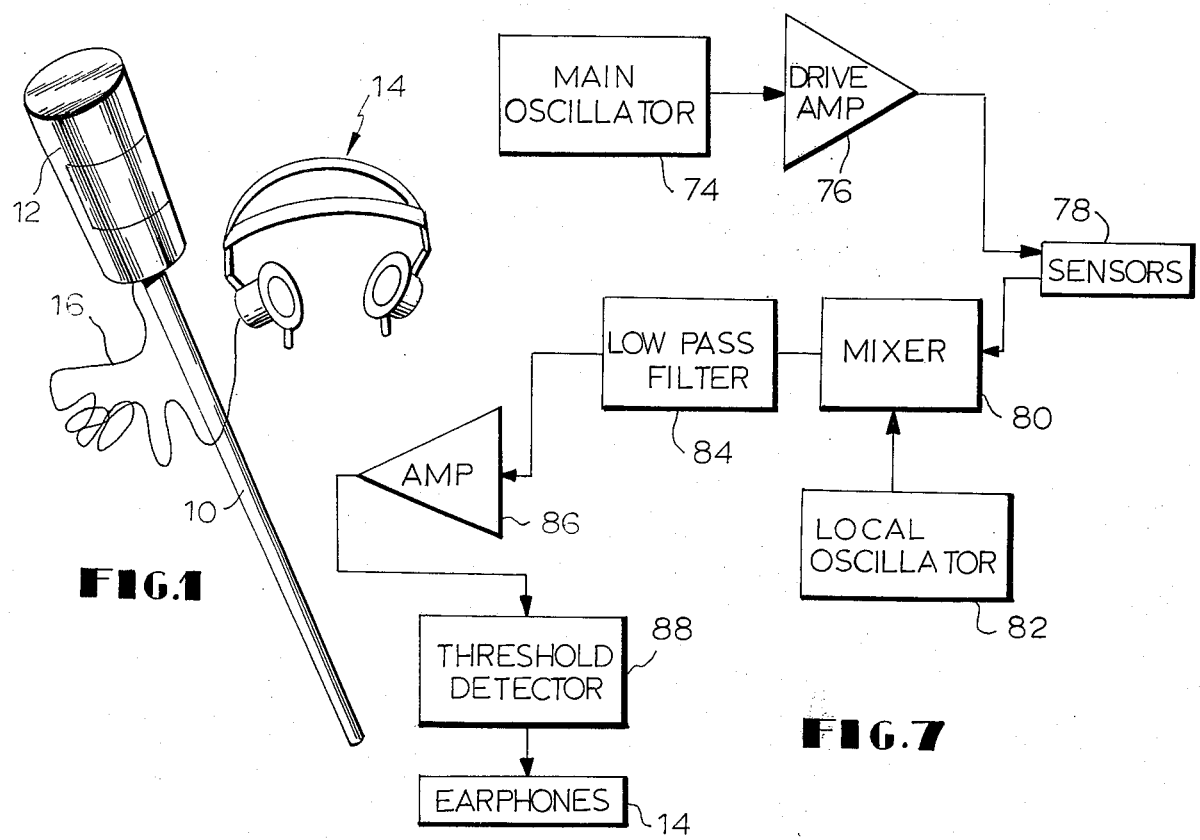
FIG. 1
FIG. 7
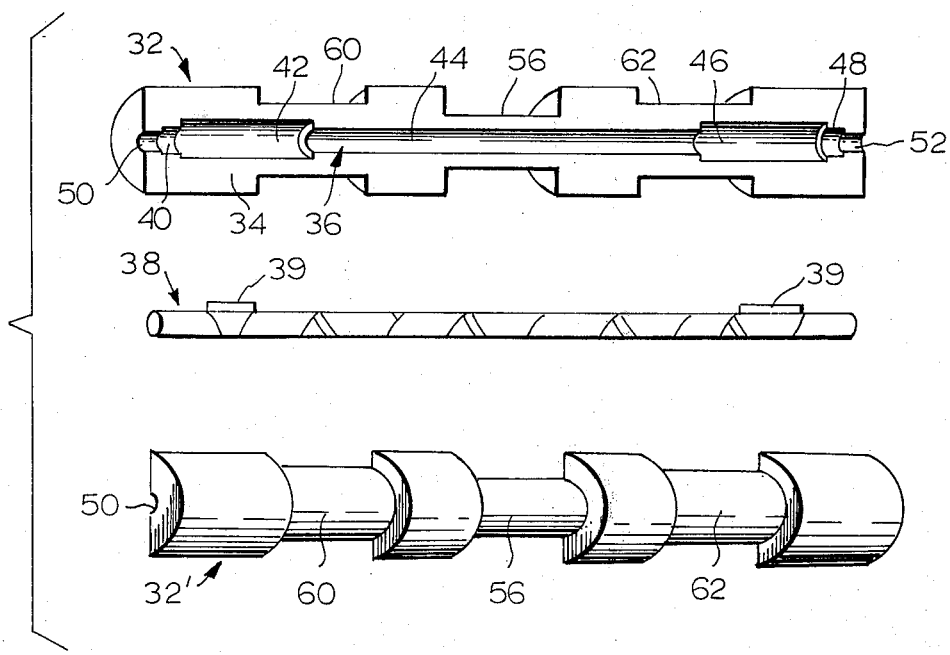
FIG. 5

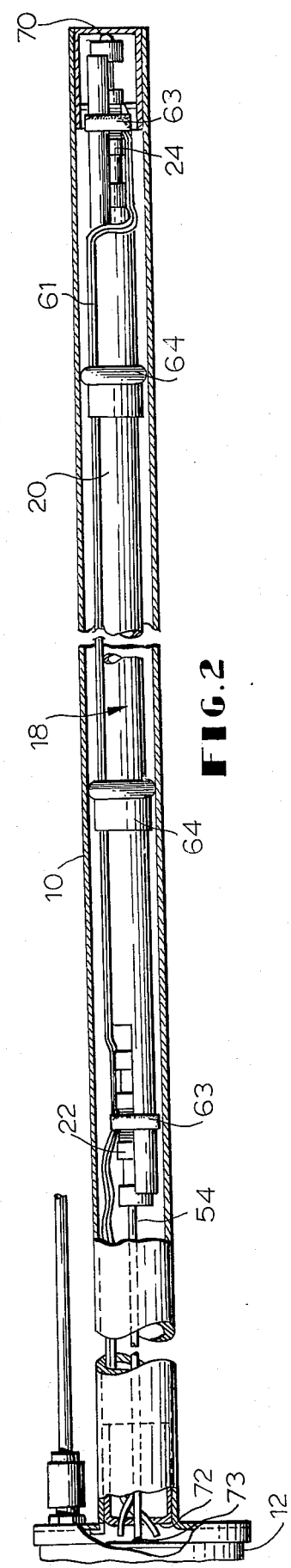
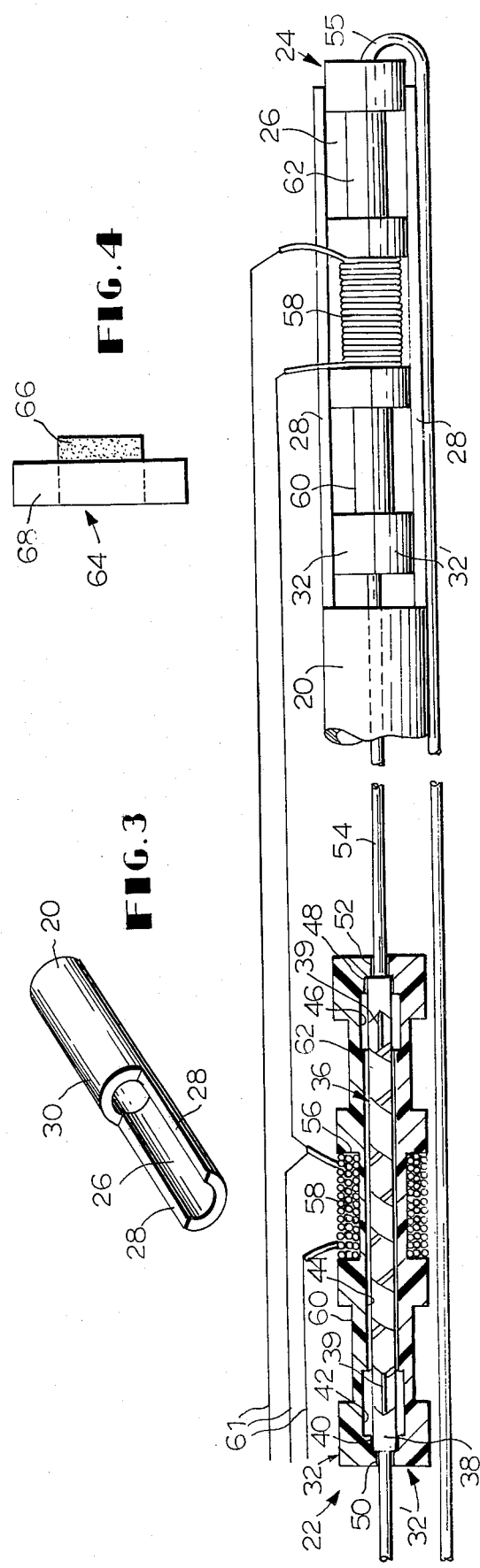
FIG. 2
FIG. 3
FIG. 4
FIG. 6

MAGNETIC LOCATOR HAVING SENSOR UNITS WITH TWO-PIECE HOUSINGS AND TUBULAR CORES

REFERENCE TO CO-PENDING APPLICATION

This application is a continuation-in-part of Ser. No. 303,598, filed Nov. 3, 1972.

BACKGROUND OF THE INVENTION

This invention relates to apparatus, such as a magnetic locator, for detecting magnetic phenomena and is more particularly concerned with an improved magnetic sensor unit which may be employed in such apparatus.

In the foregoing co-pending application, magnetic locator apparatus is described which employs an elongated tubular housing containing a pair of spaced magnetic sensor units which are supported in longitudinal grooves formed at opposite ends of a tubular support. A stiff hairpin excitation wire extends through the sensor units and through the tubular support. The preferred sensor units are of the flux-gate type, and include one or more elongated tubular magnetic cores for producing an output signal at twice the frequency of the excitation oscillations when a magnetic object is detected. This signal is mixed with the output of a local oscillator to produce a beat frequency which is passed through a threshold detector to earphones.

BRIEF DESCRIPTION OF THE INVENTION

The present invention is directed to an improvement upon the magnetic locator of the aforesaid co-pending application, and particularly concerns simplification of the magnetic sensor units in order to reduce the assembly time and the material cost of the sensor units and of magnetic locator apparatus employing such sensor units.

It is, accordingly, a principal object of the invention to provide simplified magnetic sensor units having high sensitivity and to provide improved magnetic locator apparatus incorporating such units and a method of manufacturing such locator apparatus.

Briefly stated, sensor units in accordance with the invention comprise a housing having a pair of semi-cylindrical housing sections with longitudinal recesses therein which cooperate when the sections are assembled to form an axially disposed cavity containing an elongated tubular magnetic core. The recesses are dimensioned so that the housing snugly engages the ends of the core while providing clearance between the central part of the core and the housing in order to avoid stressing the core. A signal winding wrapped about the housing in a central circumferential groove holds the housing sections together around the core and provides close magnetic coupling to the core.

In a magnetic locator in accordance with the invention, each end of an elongated tubular support is cut away at a side thereof to form a longitudinal groove of approximately semi-circular cross section. A sensor unit in accordance with the invention is snapped into each groove, being oriented so that the housing sections are clamped together by the support for preventing movement of the core in the housing.

BRIEF DESCRIPTION OF THE DRAWINGS

The invention will be further described in conjunction with the accompanying drawings, which illustrate a preferred and exemplary embodiment, and wherein:

FIG. 1 is a perspective view showing the external configuration of a magnetic locator employing the magnetic sensor units of the invention;

FIG. 2 is a longitudinal view, partly in section, showing the internal arrangement of the locator, and particularly showing the manner in which the magnetic sensor units are mounted;

FIG. 3 is a fragmentary perspective view showing one end of the tubular support for the sensor units;

FIG. 4 is a plan view illustrating a bushing subassembly employed in the magnetic locator;

FIG. 5 is an exploded perspective view of a magnetic sensor unit in accordance with the invention;

FIG. 6 is a bottom view of the tubular support and sensor units, with the support partly cut away and with one of the sensor units in cross section to illustrate the manner in which the sensor units of the invention are assembled with the excitation conductor and signal pick-up windings; and FIG. 7 is a block diagram of a circuit employed in the magnetic locator of FIG. 1.

DETAILED DESCRIPTION OF THE INVENTION

Referring to the drawings, FIG. 1 illustrates the external configuration of a magnetic locator of the type disclosed in applicant's aforesaid co-pending application (incorporated herein by reference), and which may advantageously employ the magnetic sensor units of the present invention. The locator resembles a broomstick with a can at one end thereof, the "broomstick" being a one-piece elongated tubular housing 10 having a smooth exterior, and the "can" being a tubular housing 12 of larger diameter fixed to one end of housing 10. Earphones 14 are connected by a cable 16 to a circuit within the housing 12. Since the locator is light-weight, the user may readily support the apparatus by grasping the top of housing 10 just below housing 12, and may sweep the free lower end of housing 10 along the ground in a search for a hidden magnetic object. Object detection will be signaled in the earphones 14, as will appear more fully hereinafter.

FIG. 2 illustrates the interior of housing 10, which contains an assembly 18 comprising a tubular support 20, magnetic sensor units 22 and 24 in accordance with the invention, and other parts which will be described hereinafter. The tubular support 20 is an elongated, non-magnetic pipe, preferably of circular cross section, and may be an aluminum tube about 22 inches long with an outer diameter of ⅝ inch and an inside diameter of 0.5 inch. To provide receptacles for the mounting of the sensor units, each end of the tube is cut away at a side thereof to form a longitudinal groove or notch, such as the groove 26 shown in FIG. 3, the groove being approximately semi-circular in cross section. The groove may be about 2½ inches long, for example, and the longitudinal edges 28 may be positioned about ¼ inch below side 30 of the pipe. The grooves at opposite ends of the tubular support 20 preferably face opposite sides of the support. This tends to produce equal and opposite stresses in the support material and thus tends to maintain parallelism, more particularly co-linearity, of the magnetic axes of the sensor units, which is necessary for accurate results.

The magnetic sensor units of the invention are shown in detail in FIGS. 5 and 6. As will be seen hereinafter, the sensor units of the invention have a shorter assembly time and a lower material cost than prior art magnetic sensor units but provide excellent sensitivity by the utilization of a single Permalloy core in an easily assembled, two-piece cylindrical housing which enables close magnetic coupling between the core and the signal winding wound about the housing. Moreover, because the core is supported in alignment with the longitudinal axis of the cylindrical housing (as will be apparent hereinafter), a pair of sensor units in accordance with the invention mounted in longitudinal grooves at opposite ends of a tubular support, such as tubular support 20 of FIG. 2, will have their magnetic axes precisely aligned with the longitudinal axis of the tubular support.

Each of the sensor units 22 and 24 comprises a cylindrical insulating housing or bobbin formed by a pair of identical semi-cylindrical housing sections 32 and 32', the longitudinal planar surface 34 of each section having a semi-cylindrical longitudinal recess 36 therein. When the sections are fitted together so that the planar surfaces 34 mate, the recesses form an elongated cavity for containing a single, elongated, tubular magnetic core 38, the cavity being aligned with the longitudinal axis of the cylindrical housing. The core is preferably formed by winding strips of magnetic material, such a Permalloy strips, about a ceramic tube and joining the ends of the strips at the laps 39 thereof, as taught by applicant's prior U.S. Pat. No. 2,981,885, for example. Each of the recesses is formed by successive recess portions 40, 42, 44, 46, and 48. End portions 40 and 48 of the recesses have cross-sectional dimensions sufficient to snugly engage the opposite ends, respectively, of the tubular core when the housing sections are assembled around the core, while the intermediate portions 42, 44 and 46 have larger cross-sectional dimensions for providing a space or air gap between the central part of the core and the housing sections. The cross-sectional dimensions of portions 42 and 46 are enlarged relative to the dimensions of the central portion 44 to provide clearance for the laps 39 of the Permalloy strips on the magnetic core. Each housing section is further provided with channels 50 and 52 at the ends thereof, corresponding channels of the two sections cooperating to form axially aligned openings connecting the ends of the cavity to the outside of the housing when the housing sections are assembled. As shown in FIG. 6, a stiff excitation wire 54 extends through the openings and through the hollow center of the tubular core. Groove sections 56 in the cylindrical surfaces of the housing sections cooperate to form a central circumferential groove in the housing in which a signal winding 58 is circumferentially wound. Additional groove sections 60 and 62 in the cylindrical surfaces of the housing sections form additional circumferential grooves for reducing the amount of material required to make the housing.

This configuration of the housing sections enables the sections to be clamped together around the tubular magnetic core to tightly secure the opposite ends of the core in recess portions 40 and 48 of the housing sections while providing clearance between the central part of the core and the housing sections so that the Permalloy strips on the core are not subjected to stresses which can undesirably affect their operation. This clearance is selected to be small so that the diameter of the housing at groove sections 56 can be small enough to provide excellent magnetic coupling between the signal winding 53 and the Permalloy strips on the core.

To assemble the sensor unit of the invention, the core is first inserted into one of the housing sections with its opposite ends received by portions 40 and 48 of the recess, respectively, the total length of the recess preferably being just sufficient to accommodate the length of the core so that the shoulders formed at the junction of those recess portions with the adjacent channels 50 and 52 restrict longitudinal movement of the core in the housing. Secondly, the other housing section is placed in position against the first housing section with the ends of the core being received by recess portions 40 and 48 in the other section. Finally, the signal winding 58 is circumferentially wound about the housing in groove 56, which clamps the housing sections together around the core.

The sensor unit 24 is then inserted into groove 26 in tubular support 20 with the planar surfaces 34 of the housing sections perpendicular to the plane which includes edges 28 of the groove, as shown in FIG. 6, to provide additional clamping together of the housing sections, the dimensions of the groove and the sensor unit being related so that the sensor unit is snapped into the groove and held snugly therein by the frictional embrace of the groove. This additional clamping prevents movement of the core in the housing. After the magnetic sensor 24 has been inserted in the groove at one end of tubular support 20, one leg of excitation conductor 54, which is bent to form a U-shaped or hairpin configuration, is inserted through sensor unit 24 and into the center of tubular support 20 until the bight 55 of the conductor engages one end of the sensor unit. The other leg of the conductor extends along the outside of the tubular support. The excitation conductor 54 is long enough so that both ends protrude well beyond the end of tubular support 20. The leg of the excitation conductor which extends through the tubular support is then inserted into the other sensor unit, such as 22, and this sensor unit is then moved to its proper position relative to the tubular support and is press-fitted into the corresponding groove in the same manner as sensor unit 24. The magnetic cores of both sensor units preferably have the same orientation in relation to their associated housing sections so that the laps 39 of the Permalloy strips on the core are aligned on the same side when the sensor units are mounted in the grooves at the ends of the tubular support, which facilitates provision of a balanced or null condition in the magnetic locator apparatus. Lead wires 61 are then soldered to the signal windings 58, as indicated in FIG. 6, the wires passing along the exterior of the tubular support 20, as shown in FIG. 2. Electrical tape 63 may be employed where desired to hold the external leg of the excitation conductor 54 and the lead wires in position.

Before the assembly 18 is inserted into the tubular housing 10, bushings 64 are provided upon the assembly at spaced locations for supporting the assembly within the tubular housing. Each bushing is preferably formed as shown in FIG. 4 by providing a strip of flat foam material 66, such as polyurethane, with a strip of adhesive tape 68 overlapping one end thereof, and by wrapping the foam material around the exterior of the tubular support 20 and securing it thereto by means of the tape. The foam bushing thus produced is large enough in diameter so as to be compressed and distorted when inserted into the housing 10. The bushings resist longitudinal movement of assembly 18 within the housing, particularly in the direction opposite to the initial insertion direction. After insertion of the assembly 18 into the housing, the open end of the housing may be closed by a tubular cap 70 held in the housing by an interference fit. At the opposite end of the housing a tubular cap 72 may also be inserted, suitable apertures being provided therein for passage of the excitation and signal conductors, by which these conductors may be extended to the electronics within the housing 12. Assembly 18 is fixed in position merely by the simple bushings 64 and by soldering the ends of the stiff excitation conductor 54 to a printed circuit board attached to a chassis fixed within housing 12, as indicated diagrammatically by reference character 73 in FIG. 2.

Referring again to FIG. 6, it will be noted that the signal lead wires 61 are connected with the signal windings 58 so as to provide a differential output. Excitation oscillations at an appropriate frequency (e.g., 10 KHz) are provided by a main oscillator 74, as shown in FIG. 7, and after suitable amplification by a drive amplifier 76 are applied to the hairpin excitation conductor 54 of the sensors, the sensors and the associated conductors being shown diagrammatically by the block 78. The differential output is applied to a mixer 80, which is also connected to a local oscillator 82. As is well known in the art, the signal frequency from the sensors when a magnetic object is detected will be twice the frequency from the main oscillator 74. This double frequency signal is mixed with the oscillations from local oscillator 82, having a frequency (e.g., 21 KHz) different from the signal frequency, so as to produce a beat frequency output at an audible frequency, such as 1,000 Hz. The beat frequency is selected by a low pass filter 84 and after amplification by an amplifier 86 is applied to the earphones 14 through a threshold detector 88, which sets a noise rejection level. The amplitude of the beat frequency signal heard in the earphones 14 will vary with the proximity of the free end of housing 10 (closed by cap 70) to a magnetic object to be located.

The sensor units of the invention, which are highly sensitive yet economical and simple in construction and which do not require complex fasteners and supports, can thus be employed to provide a magnetic locator having reduced manufacturing cost.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. A magnetic sensor comprising a housing having an elongated cylindrical cavity containing a tubular cylindrical magnetic core, said housing comprising a pair of elongated non-magnetic housing sections having mating longitudinal planar surfaces and having longitudinal semi-cylindrical recesses which cooperate to form said cavity, the end portions of the recesses being dimensioned to engage the end portions of the core snugly and the intermediate portions of the recesses having larger cross-dimensions than the end portions of the recesses and providing clearance between the central part of the core and the housing, the housing sections having means forming axially aligned openings connecting the ends of the cavity to the outside of the housing, said openings having cross-dimensions less than the cross-dimensions of the end portions of the core and being juxtaposed with the end extremities of the core, said sensor further comprising an excitation conductor passing axially through said openings and through said core for providing a magnetic excitation field coupled to said core.

2. A magnetic sensor as set forth in claim 1, wherein the housing sections have means forming a circumferential groove centrally on the housing, and wherein the sensor further comprises a signal winding wound about the housing in the groove.

3. A magnetic sensor as set forth in claim 1, wherein the core is formed of strips of magnetic material wound about a ceramic tube with the ends of the strips being joined at the laps thereof, and wherein portions of the recesses are enlarged to provide clearance for said laps.

4. Magnetic locator apparatus comprising:
a tubular support having each end cut away at a side thereof to form a longitudinal groove of substantially semi-circular cross section at each end of the support;
a magnetic sensor unit mounted in each groove, each sensor unit including a cylindrical housing formed of a pair of semi-cylindrical non-magnetic housing sections with longitudinal recesses therein which cooperate to form an axially disposed elongated cavity containing a tubular magnetic core, and further including a signal winding wound about the housing in a circumferential groove on the housing; and
an excitation conductor passing axially through the tubular sensor units and through the tubular support for providing a magnetic excitation field coupled to said cores.

5. Magnetic locator apparatus as set forth in claim 4, wherein the recesses are dimensioned so that the housing snugly engages the ends of the core and provides clearance between the central part of the core and the housing.

6. Magnetic locator apparatus as set forth in claim 4, wherein the grooves face opposite sides of the support.

7. Magnetic locator apparatus as set forth in claim 4, wherein the excitation conductor comprises a stiff, generally U-shaped conductor having one leg passing through the sensor units and the tubular support in one direction and having its other leg extending along the outside of the tubular support in the opposite direction.

8. Magnetic locator apparatus as set forth in claim 4, wherein the housing sections of each sensor unit have mating longitudinal planar surfaces and wherein each sensor unit is mounted in its associated groove with the longitudinal planar surfaces of its housing sections substantially perpendicular to a plane which includes the longitudinal edges of the groove.

* * * * *